June 22, 1965

C. E. MOORE 3,189,991

TUBE JOINING DEVICE

Filed May 15, 1962

INVENTOR.
CECIL E. MOORE

BY

ATTORNEY

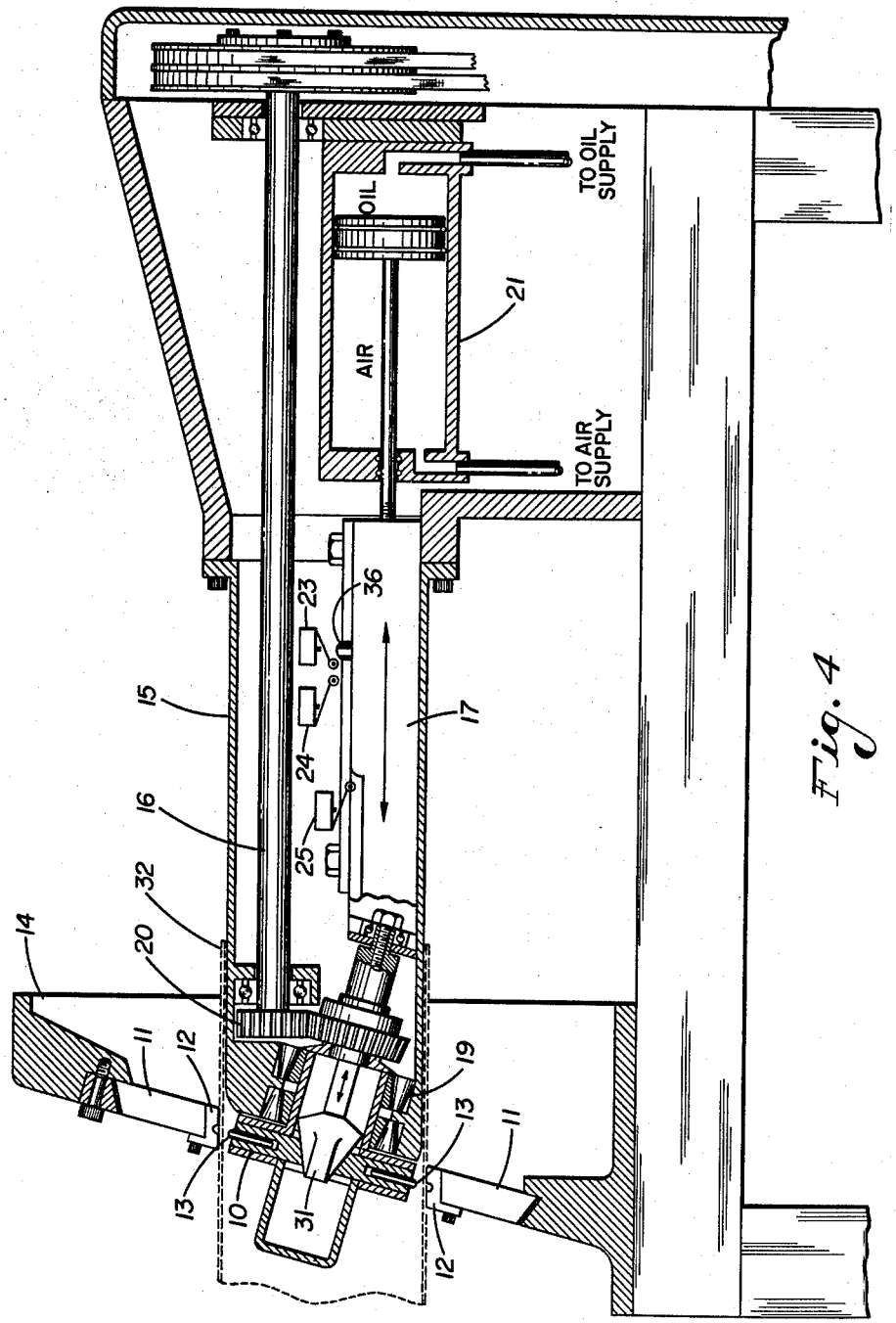

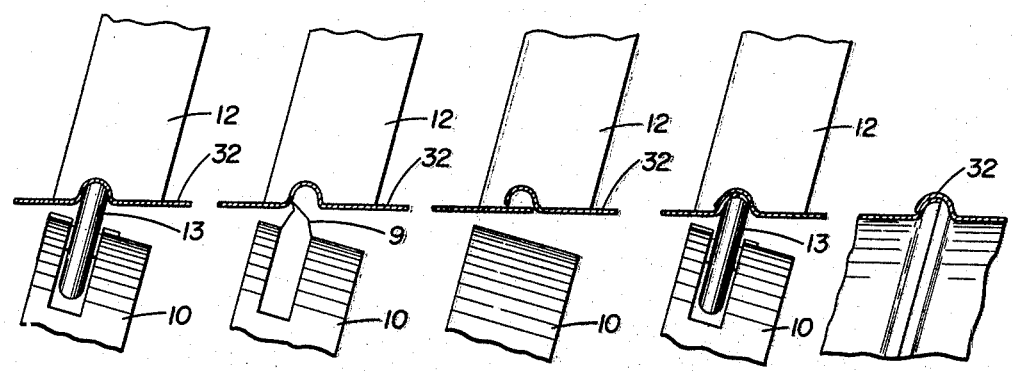
Fig.5A   Fig.5B   Fig.5C   Fig.5D   Fig.5E
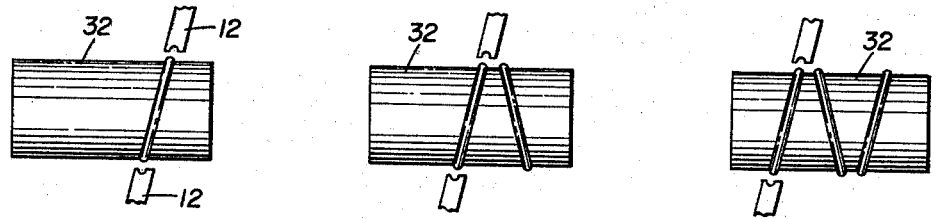
Fig.6A   Fig.6B   Fig.6C
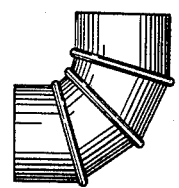
Fig.7   Fig.8

3,189,991
TUBE JOINING DEVICE
Cecil E. Moore, Cedar Rapids, Iowa
Filed May 15, 1962, Ser. No. 194,941
7 Claims. (Cl. 29—437)

This invention relates to a machine or device for joining sheet metal tubes or cylinders so as to permit rotation of the joined cylinders about each other.

In the prior art there have been many methods and systems with the resultant apparatus for performing these methods and systems to join together two or more cylinders of a semi-rigid material, such as sheet metal. In some cases flanges have been provided on one or more sections of the tube or cylinder of sheet material so that when they are joined the diameter of the individual tubes may be adjusted and thus fasten two or more pieces of the tubing together. In other instances tubing structures have been devised that permit adjustable elbows of cylindrical materials wherein certain of the cylinders are split along their short sides or, in some instances, along their long sides and then closed by any of a plurality of closing means after being adjusted or placed upon a second cylinder. In none of the prior art elbows which have been made according to prior methods and/or apparatus has it been possible to freely rotate the two cylinders through 360° without the cylinder becoming bound or, in some instances, completely disengaged.

It is an object of this invention to provide a mechanism for automatically joining two cylinders of semi-rigid material together to provide a rotatable or adjustable joint.

It is a further object of this invention to provide means for automatically and economically forming adjustable sheet metal elbows wherein the pieces are rotatable about each other through 360°.

It is a further object of this invention to provide a joint which does not bind or collapse when rotated through 360°.

It is a still further object of this invention to provide a novel method and apparatus for rapidly and economically joining together sheet metal cylinders without the use of any adjustable contraction means to force fit one cylinder to another.

It is a further object of this invention to provide a relatively portable apparatus whereby preformed sheet metal tubing may be joined in adjustable elbows as required at the location where the sheet metal is to be used.

It is another object of this invention to provide an automatic apparatus for joining cylindrical tubing together so that the tubes may be adjusted to fit any of a plurality of determined angles.

These and other objects and advantages of the invention will become apparent and be readily understood from the following detailed description taken in connection with the accompanying drawings, wherein:

FIG. 4 is a sectional view of the invention;

FIGS. 5A, 5B, 5C, 5D and 5E illustrate the sequential operation of the rollers and cutters upon a sheet metal cylinder; and where FIG. 5E illustrates the resultant joint between two pieces of sheet metal cylinders;

Figure 9:
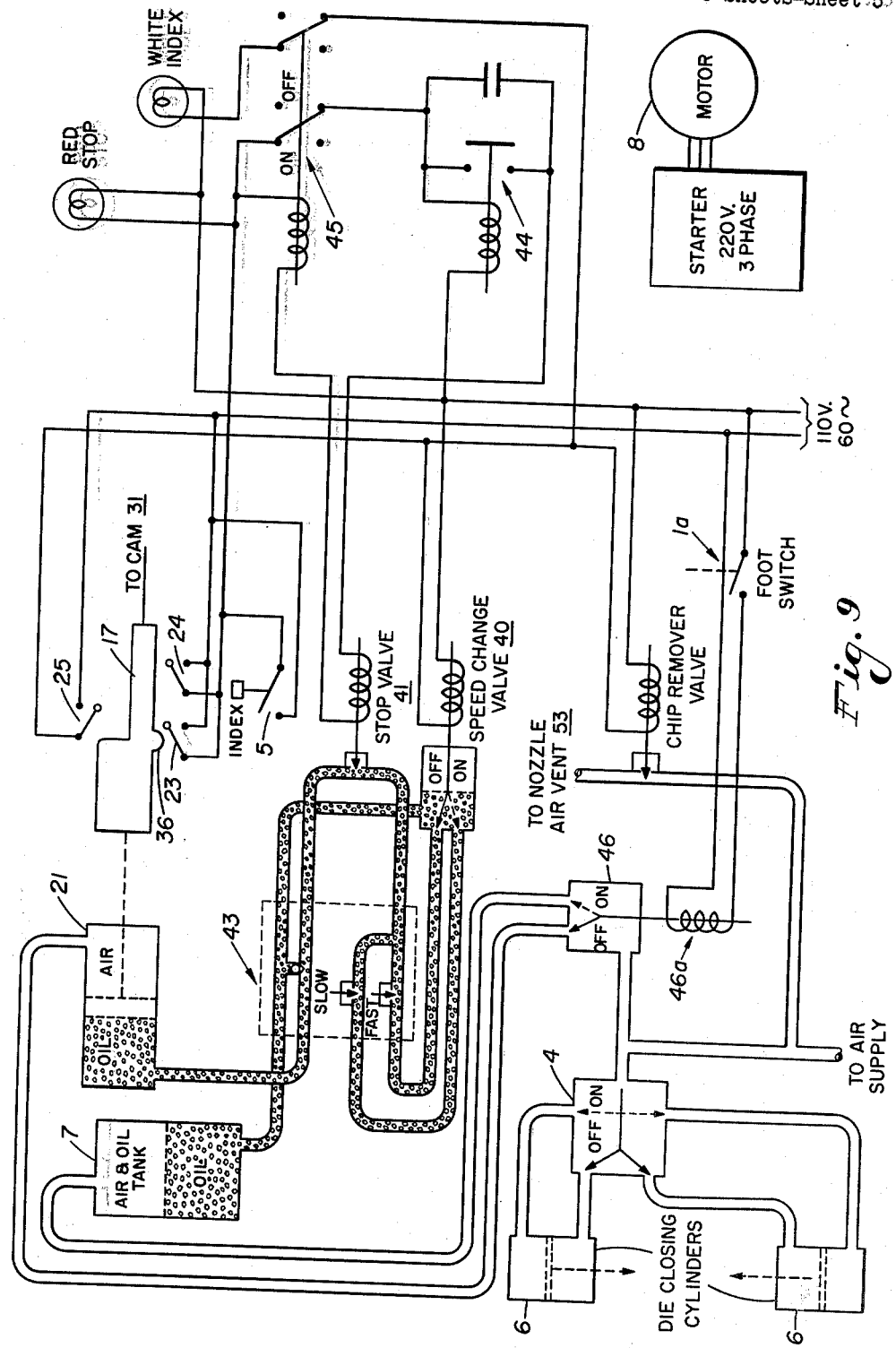

FIGS. 6A, 6B, and 6C illustrate progressive formation of a plurality of angle joints;

FIGS. 7 and 8 are illustrative views of sheet metal cylinders formed with a plurality of rotating joints by this invention; and FIG. 9 is a schematic diagram of the control system for this invention.

Figure 1:
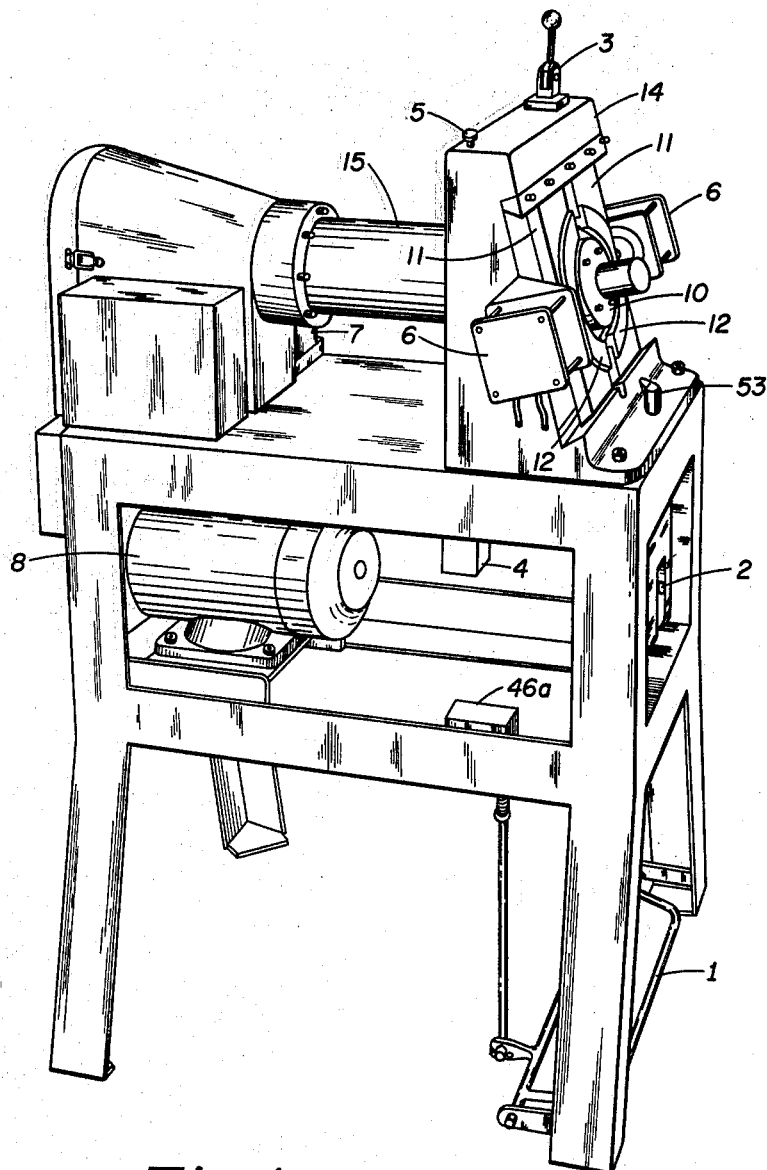
FIG. 1 is an isometric view of one embodiment of this invention.
Figure 2:
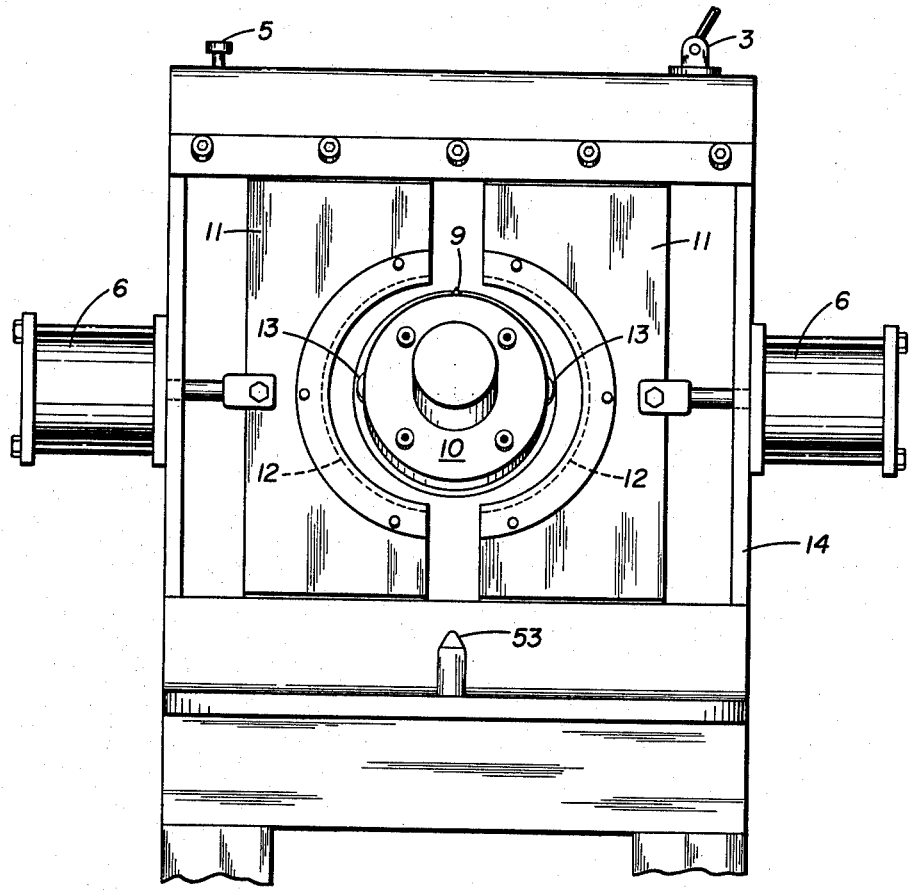
FIG. 2 is a front view of the front casting 14.

Referring now to the drawings and most especially to FIG. 1, there is illustrated therein a foot pedal control 1. This foot pedal control is utilized to operate, i.e., open the air valve 46 (FIG. 9) by means of actuating the relay 46a. Opening valve 46 permits air pressure from the air supply (not illustrated) to be applied to the air oil tank 7. Also illustrated in FIG. 1 and other figures is the hand lever 3. Hand lever 3 operates the valve 4. Operation of valve 4 by means of the hand lever 3 permits air from the air supply to be supplied to the air cylinder 6. The application of air pressure to air cylinder 6 forces the die holders or plates 11 into a closed position. Also shown in FIG. 1 is an index button 5. This index button 5 is utilized to actuate a control relay so that at any position during the operation of this invention the programming may be advanced one step at a time for each depression of the index button. Thus in the event there has been a failure to cut a cylinder or a mismatch of sheet metal cylinders, by depressing the index button the programming controls may be brought back to the original starting position and thereby render the apparatus ready to make the next joining operation a completely automatic one.

There is a rotating head 10 which is mounted in mandrel 15. This rotating head is within the confines of the die holders 11 and the dies 12, and is rotated by a drive shaft 16 from a motor. The main drive motor 8 is illustrated in FIG. 1 and operates through a plurality of pulleys to rotate the main drive shaft.

There is a front casting 14 mounted upon the base of this apparatus and inclined at a predetermined angle to the plane of the base.

Also illustrated in FIG. 1 is an air vent 53 which releases an amount of air sufficient to clear the die face of chips and thereby improve the operation of this invention.

In FIG. 4 there is illustrated the detailed drive mechanism including the drive shaft 16, the angular gears 20 and the tapered roller bearings 19 which are used to support the cam 31. The motion of the cam 31 is obtained through reciprocating linear motion of the ram 17, as shown in FIG. 4, and which will be described in more detail later on. There is a cam 36 located upon the ram 17 which operates in cooperation with switches 23, 24 and 25 to control both the speed and the motion of the ram 17.

A typical operation using this invention to join together two cylinders of material which may be of sheet metal or plastic, or any other rigid or semi-rigid material, will now be described. A piece of cylindrical sheet metal 32 is inserted or placed over the mandrel 15 as illustrated in FIG. 4. Thereupon, the hand lever 3 will be operated, which in turn will operate the valve 4 and permit compressed air to be applied to the cylinders 6. Air applied to the cylinders 6 moves on their bed the die plates 11 as can be seen in FIG. 1. The die plates rest upon a bed formed in the front casting 14. A detailed description of how these plates move on their bed is not believed necessary, as it is believed obvious to one skilled in the art that the bearing surface must be free and the friction must be overcome by the force of the operation of air cylinders 6. The dies 12, retained by die plates 11, are elliptical in shape. That is, the dies are formed in an oval or ellipse which corresponds to, but is rotated 90° from and in the plane of, the ellipse formed by the intersection of cylinder 32 and the plane of the front (angled) face of casting 14. Normally, if a cylinder or tube is cut at an angle other than 90° to its longitudinal axis, the periphery will describe not a perfect circle, but will describe an oval with both a major and minor axis. If this cylinder is to be cut at an angle other than 90° (and in order to form a rotating adjustable joint, the tubing must be cut at an angle other than 90°), then the dies must be cut at an oval as described above.

Thus, when the die holders or plates 11 are moved against the cylinder and clamped in place, the dies deform the plane or periphery of the cylinder so that a perfect circle will be cut. That is, the ellipse viewed at the intersection of the cylinder 32 with the plane of the dies 12, prior to clamping, is deformed by the ellipse 90° thereto (as the dies are clamped on the cylinder) to form a perfect circle. The forming rollers and cutter in the rotating head 10 can now be placed equidistant to any point on the surface of the tube or cylinder. Thus, the rollers 13 and the cutter 9 are enabled to cut efficiently and accurately. This efficiency results from the fact that the entire perimeter of the cylinder is cut with the same pressure during rotation of the rotating head whereas this would not be true if the head were cutting an oval perimeter in the cylinder. Following the joint-forming operation, to be described, the cylinder 32, being semi-rigid, returns to its original shape, this being enhanced by the movement of the cylinder over mandrel 15.

Figure 3:
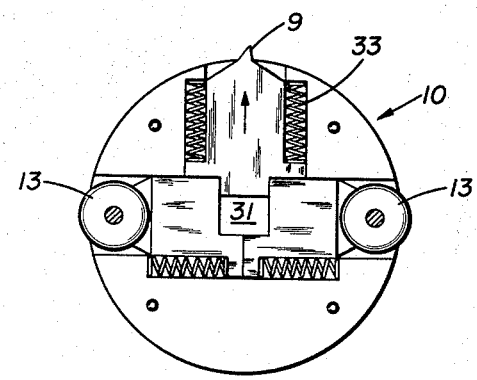
FIG. 3 is a detailed view of the rotating head showing the forming rollers and cutters.

Now that the die holders 11 have been moved into place and the dies 12 having been clamped against the cylinder, the foot pedal 1 is depressed. When the foot pedal 1 is first depressed, switch 1a (FIG. 9) is closed, and as described before, relay 46a (FIG. 9) operates valve 46 (FIG. 9) to apply air pressure to the air oil tank 7. Pressure thus applied to the air oil tank 7 moves the ram 17 forward. The ram 17 moves forward until the cam 36 reaches the switch 23. Motion of the ram 17, as shown in FIG. 4, until it reaches switch 23, will move laterally the cam 31 in the rotating head 10. The cam 31 forces the rollers 13 outward against the pressure of slide return springs 33 (FIG. 3). At this point the speed change valve 40 is operated so that the oil pressure is applied to the oil air chamber 21 through either the fast or slow port (FIG. 9). This oil, after passing the slow or fast port, goes into the stop valve 41. If the stop valve 41 is open it then goes to the air oil cylinder 21 to advance the cam in the rotating head. The position of valves 40 and 41 and whether or not the oil is metered through the fast or slow port is determined by the positions of relays 44 and 45 (FIG. 9). Thus, if the rollers are to be in contact with the cylinder 32, then the fast valve will be operated and the position of the ram and the resultant position of the cam within the rotating head will be such that the rotating head is being driven at a rapid rate by the motor and the control switches. If the ram has progressed to the point where the cutter is operated, then the linear advance of the ram 17 and cam 31 is slowed by allowing oil to be metered through the slow port of valve 43.

To return to the operational sequence, when the foot switch is depressed the ram 17 advances until the first stop switch 23 is encountered. At this point the ram's motion is stopped by the action stop switch 23 and its associated circuitry.

The rollers 13 have been forced outward by the operation of cam 31 and, as illustrated in FIG. 5A, the pressure of these rollers against the cylinder forces the metal into the die 12 so that there is a bead of metal conforming to the die formation generated in the surface of cylinder 32. After the rollers 13 have formed this bead in the metal 32, the switch 45 (FIG. 9) is operated again.

In one embodiment of this invention which was constructed, switch 45 was a memory relay in that it was a double throw latching relay. This relay determines which stop switch is operative to control the motion of ram 17.

Ram 17 is now permitted by the memory relay 45 to advance to the second position and operate both the stop switch 24 and the speed change switch 25. The cam 31 is now advanced further into the rotating head 10. The proper cutting of the surface of cam 31 causes the rollers 13 to retract and the cutter 9 to move outward.

The speed change valve is now operated as well as the power relay 44 to change the speed of linear movement of ram 17. The cutter 9 must, of necessity, proceed at a slower speed than do the rollers 13. The cutter 9 comes into contact with the sheet metal tube 32 at the edge of the bead formed by the rollers. This is best illustrated in FIG. 5B which shows in detail how the cutting edge is applied to the bead formed in the cylinder. This reduction in speed permits the cutter to cut off the tube without undue shredding due to excessive speed.

When the cutter 9 has severed the cylinder 32, the relay 45 once again operates. The cutter 9 is retracted into the rotating head 10 and the ram 17 is withdrawn and switch 1 is automatically opened removing the air pressure from the air oil tank 7, permitting the oil to be forced back through the quick drain valve or common drain valve 43 (FIG. 9). This permits the oil to bypass all other valves and return rapidly.

The cylinder is now in two pieces, the first piece having a bead formed in its periphery as shown in FIG. 5B, and the second piece being the remaining portion of the cylinder which has been cut so that the resultant periphery is a circle through the plane of the face of the cylinder. This second portion of the cylinder is now moved forward or further on to the mandrel 15 until it is in the position shown in FIG. 5C. That is, the leading edge of the second portion of the cylinder is substantially in contact with the smooth undisturbed portion of cylinder 32 and has practically closed the bead formed in the first section of cylinder 32.

Foot pedal 1 is again depressed closing switch 1a and again the sequence of events described hereinbefore occurs which forces the rollers 13 into the dies 12 and substantially joins the first and second sections of the cylinder as shown in FIG. 5D.

The indexing and control of this entire sequence of operations is done by the memory relay 45 in cooperation with the power relay 44.

The speed change switch is in its rapid motion position so that the speed cooperates with the pressure of the rollers 13 to mold and force the second section of the cylinder up into the first bead formed in the first portion of the tube 32.

The cam 31 may be so adjusted that a loose or tight joint is formed in the sheet metal tubing, the tightness of the joint being dependent upon how deep the forming wheels 13 are forced into the bead or the die, depending upon whether it is the first bead or second bead formed.

The mechanism 53, as illustrated in FIG. 1, will blow the chips formed by the cutter out the end of the tube so that no chips are lodged between the two pieces of tubing. In one constructed embodiment of this invention this air was the exhaust air of the air oil cylinder 7 when the ram was retracted, immediately after the cutting operation.

The sheet metal tube which has been formed by this invention may now be removed from the apparatus and adjusted from zero degrees to twice the number of degrees of the angle of the joint. Thus, if the die plates 12 closed on the tube 32 at an angle of 15° then the tube could be adjusted as shown in FIGS. 7 and 8 to angles of from zero degrees to 30° with the axis of the cylinder for each joint. The angle which the die plates 12 must make with the cylinder so that a perfect circle is cut is a function of the angle at which the front casting 14 joins the surface of the base of this invention.

FIGS. 6A, 6B, and 6C illustrate how successive joints may be made upon a cylinder with this machine so that a tube or cylinder which is cut and jointed a plurality of times (each time the tube being rotated 180°) is formed into an elbow which will form an angle equal to twice the angle of the die plates with the tube multiplied by the number of joints in the elbow. It is to be remembered that these joints are substantially a perfect fit and, because they are not ovals as has been the case in the previous art, they are easily rotatable and do not bind or become disjointed as when they are rotated.

Inasmuch as many changes could be made in the above construction and different embodiments of this invention could be made without departing from the scope thereof, it is intended that all matter contained in the above description or shown in the accompanying drawings shall be interpreted as illustrative and not in a limiting sense.

What is claimed is:

1. A machine for forming rotatable angle joints in cylindrical material comprising: means for holding said cylindrical material, said holding means including die means positioned at a predetermined oblique angle to the longitudinal axis of said cylindrical material and having an elliptical contour corresponding to but rotated 90° from the contour of said cylindrical material to the plane of intersection with said die means, means for forming a first bead on the surface of said cylindrical material conforming to said die means, means for cutting said cylindrical material along one edge of said bead, means for forming a second bead in said cylindrical material within said first bead after the cut edge of said cylindrical material is advanced and juxtaposed to said first bead, thereby forming a rotatable joint between said first and said second pieces of cylindrical material.

2. A machine for forming rotatable angle joints in cylindrical material comprising: means for holding said cylindrical material, said holding means including die means to deform said cylindrical material sufficiently so that a cutting of said surface results in a perfect circle perimeter on the face of the cut, means for forming a first bead on the surface of said cylindrical material conforming to said die means, means for cutting said cylindrical material along one edge of said bead, means for forming a second bead in said cylindrical material within said first bead after the cut edge of said cylindrical material is advanced and juxtaposed to said first bead, thereby forming a rotatable joint between said first and said second pieces of cylindrical material.

3. A machine for forming rotatable angle joints in cylindrical material comprising: means for holding said cylindrical material, said holding means including die means positioned at an oblique angle to the longitudinal axis of said cylindrical material, said angle being predetermined in accordance with the angle to be formed at said joint, said die means having an elliptical contour corresponding to and rotated 90° from the contour of said cylindrical material in the plane of intersection therebetween, means for forming a first bead on the surface of said cylindrical material conforming to said die means, means for cutting said cylindrical material along one edge of said bead to form a circle on the face of said cut, means for forming a second bead in said cylindrical material within said first bead after the cut edge of said cylindrical material is advanced and juxtaposed to said first bead thereby forming a rotatable joint between said first and said second pieces of said cylindrical material.

4. A method of forming rotatable angle joints in hollow cylindrical material comprising the steps of:
 (a) deforming the surface of said cylindrical material at an elliptical contour thereof so as to form a substantially circular periphery along said contour;
 (b) beading said surface along said contour;
 (c) cutting said cylindrical material into two separate pieces along said contour, such that one of said pieces is unbeaded;
 (d) advancing said unbeaded piece into said beaded piece; and
 (e) beading said unbeaded piece such that said second bead is within said first bead, thereby forming a rotatable angle joint between said two pieces.

5. A method of forming angle joints in hollow cylindrical material comprising the steps of:
 (a) deforming the surface of said cylindrical material along a contour defined by an ellipse having its major axis at a predetermined angle to the longitudinal axis of said cylindrical material, to form a substantially circular periphery at said contour;
 (b) forming a bead in said cylindrical material along said contour;
 (c) cutting said cylindrical material along said contour such that one of the two cylindrical pieces obtained thereby has said bead thereon;
 (d) advancing the unbeaded piece into juxtaposition with said bead; and
 (e) beading said unbeaded piece such that the two beads coincide, thereby forming a rotatable angle joint between said two pieces.

6. A machine for forming rotatable joints in cylinders comprising: means for holding a cylinder, means for beading the surface of said cylinder, and means for cutting said cylinder along the edge of a bead developed on the surface to divide said cylinder into first and second pieces with said first piece including the bead produced by the beading means, said beading means being operable to form a second bead in said second piece after the cut edge of the second piece is advanced and juxtaposed to the bead of said first cylinder piece, with said second bead conforming to the bead of the first piece to form a rotatable joint between said first and second pieces of the cylinder.

7. The invention according to claim 6, wherein the beading means and the cutting means are disposed at a predetermined angle with respect to the cylinder holding means.

References Cited by the Examiner

UNITED STATES PATENTS

| | | | |
|---|---|---|---|
| 1,464,318 | 8/23 | Hauf | 113—36 |
| 1,533,660 | 4/25 | Purnell | 153—9 |
| 3,010,506 | 11/61 | Bellatorre | 153—29 |

CHARLES W. LANHAM, *Primary Examiner.*

MICHAEL V. BRINDISI, *Examiner.*